(12) United States Patent
Liguori et al.

(10) Patent No.: US 8,372,319 B2
(45) Date of Patent: Feb. 12, 2013

(54) OPHTHALMIC EYEWEAR WITH LENSES CAST INTO A FRAME AND METHODS OF FABRICATION

(75) Inventors: Daniel Liguori, San Diego, CA (US); Saul Heiman, San Diego, CA (US); Thomas Liguori, Poway, CA (US); Jerome Legerton, San Diego, CA (US)

(73) Assignee: Liguori Management, San Diego, CA (US)

( * ) Notice: Subject to any disclaimer, the term of this patent is extended or adjusted under 35 U.S.C. 154(b) by 645 days.

(21) Appl. No.: 12/492,053

(22) Filed: Jun. 25, 2009

(65) Prior Publication Data
US 2010/0328603 A1    Dec. 30, 2010

(51) Int. Cl.
B29D 11/00    (2006.01)
(52) U.S. Cl. ......................................................... 264/2.5
(58) Field of Classification Search .................. 264/2.5, 264/219, 1.36, 1.38; 425/808
See application file for complete search history.

(56) References Cited

U.S. PATENT DOCUMENTS

| | | |
|---|---|---|
| 3,482,906 A | 12/1969 | Volk |
| 3,684,357 A | 8/1972 | Tsuetaki |
| 3,973,837 A | 8/1976 | Page |
| 3,973,838 A | 8/1976 | Page |
| 4,194,815 A | 3/1980 | Trombley |
| 4,208,362 A | 6/1980 | Deichert et al. |
| 4,943,150 A | 7/1990 | Deichert et al. |
| 5,450,145 A | 9/1995 | Valentine |
| 5,570,142 A | 10/1996 | Lieberman |
| 5,790,235 A | 8/1998 | Kirschbaum |
| 6,491,393 B1 | 12/2002 | Appleton |
| 6,579,478 B2 * | 6/2003 | Lossman et al. ............... 264/2.5 |
| 7,431,455 B2 | 10/2008 | Chernyak |
| 2002/0093623 A1 | 7/2002 | Duppstadt |
| 2005/0203619 A1 | 9/2005 | Altmann |
| 2005/0280777 A1 | 12/2005 | Dai |
| 2006/0023162 A1 | 2/2006 | Azar et al. |
| 2007/0091259 A1 | 4/2007 | Svochak |
| 2007/0291224 A1 | 12/2007 | Lai |
| 2008/0007694 A1 | 1/2008 | Wei et al. |
| 2008/0013043 A1 | 1/2008 | Ye |

(Continued)

FOREIGN PATENT DOCUMENTS

EP    0 445 994    9/1991

*Primary Examiner* — Hung Dang
(74) *Attorney, Agent, or Firm* — David E. Heisey; Sheppard Mullin Richter & Hampton

(57) ABSTRACT

The present invention is directed to a method of manufacturing spectacle lens eyewear using a block mold, front and back optical inserts, front and back optical insert gaskets, a protractor insert, a closing mechanism and a preformed frame, the method comprising the steps of: selecting a front optical insert from a look up table or computer program product and assembling the insert into the block mold; selecting a front optical insert gasket and assembling the gasket onto the front optical insert; assembling the frame front onto the front optical insert gasket; selecting a back optical insert gasket and assembling the gasket onto the back side of the frame front; selecting a back optical insert from a look up table or computer program product and assembling the insert onto the back optical insert gasket; assembling the protractor insert and adjusting the position of the back optical insert to the axis indicated on a look up table or computer program product; assembling the mold closing mechanism and securing the mold; filling the cavity through a first capillary tube; curing the closed mold to polymerize the lenses; removing the ophthalmic eyewear from the block mold and releasing the front and back optical inserts and insert gaskets; and removing the capillary tube housing and attaching earpieces.

24 Claims, 9 Drawing Sheets

U.S. PATENT DOCUMENTS

2008/0100612 A1 5/2008 Dastmalchi et al.
2008/0212020 A1 9/2008 Legerton

* cited by examiner

OPHTHALMIC EYEWEAR WITH LENSES CAST INTO A FRAME AND METHODS OF FABRICATION

FIELD OF THE INVENTION

The present invention relates generally ophthalmic eyewear. More particularly, the present invention relates to ophthalmic eyewear with prescription lenses for the correction of low and higher order aberrations and presbyopia comprising lenses that are cast into a frame or simultaneously with the casting of the frame, and methods and apparatus of the casting system.

BACKGROUND OF THE INVENTION

Conventional spectacle eyewear has been produced by the process of first manufacturing frames or frame components followed by cutting and edging lenses to fit the frame, or to be mounted together by a bridge and including end-pieces to which temples or earpieces are attached. The spectacle lenses are produced in an uncut form by way of casting or molding a semi-finished blank with one surface complete and surfacing the opposing surface to create a finished prescription or by casting or molding a lens wherein both surfaces are finished. The finished uncut blank is then oriented and displaced to produce a final astigmatism axis and centering of the lens to correspond with the intended vertical and horizontal size of the frame and the pupillary distance of the intended wearer. The conventional methods of fabricating eyewear require machinery for cutting and edging finished blanks to a proper size and shape of eyewear.

It is estimated that more than 300 million people in the world are functionally blind due to uncorrected refractive errors. The majority of these people lack the geographic or economic access to eye examinations and acquisition of prescription eyewear. The required inventory of uncut semi-finished blanks, finished blanks, surfacing equipment and cutting and edging equipment is far too costly and skilled-labor intensive to be available to this population in need of prescription eyewear. Even if the equipment and labor were available, the power and service requirements for the machinery remain high and the need for inventory of semi-finished or finished blanks persists.

Charitable organizations are known to conduct missions to provide eye examination services and eyewear to this population. The most common practice is to collect used eye glasses, catalog the prescriptions and attempt to match a required prescription with one found in the collected used eye glasses. The practice of collection, cataloging, transporting and delivering the used eyewear is inherently inefficient and the result is most often a poorly matched prescription in a used and questionably serviceable frame.

SUMMARY OF THE INVENTION

Various embodiments of the present invention are directed to ophthalmic eyewear with prescription lenses for the correction of low and higher order aberrations and presbyopia such as lenses that are cast into a frame or simultaneously with the casting of the frame, and methods and apparatus of the casting system.

The low cost eyewear described herein does not require machinery or skilled labor for manufacturing and can be produced in the field with minimal or no electrical power. Some embodiments of the present invention describe eyewear produced from a liquid monomer that is cured with near ultraviolet and white light and/or sunlight along with a frame of the same material, or into a preformed frame or by encapsulation of components of rimless frame components.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The present invention relates to ophthalmic eyewear with prescription lenses for the correction of low and higher order aberrations and presbyopia. In some embodiments, the lenses that are cast into a frame or simultaneously with the casting of the frame. Methods for casting the lenses into a frame are also provided.

Various embodiments of the invention are directed to spectacle lens ophthalmic eyewear including a frame front with a bridge or nosepiece and end-pieces for attaching earpieces, and at least one of a right and left lens that is cast into the frame or around the mounts for the nose-piece and the end-pieces, or simultaneously with the frame front. A block mold is provided along with a front and back optical insert, a front gasket and a back gasket, a protractor insert for alignment of the axis of at least one of the front and back inserts, and a means of closing and applying force to cause the mold, optical inserts and gaskets to seal. A curing station or means of directing ambient sunlight may be provided. Alternatively, the curing or polymerizing in situ on the eyeglass frame or any other frame can be achieved by the controlled application of heat.

A. Ophthalmic Eyewear of the Present Invention

Figure 1A:
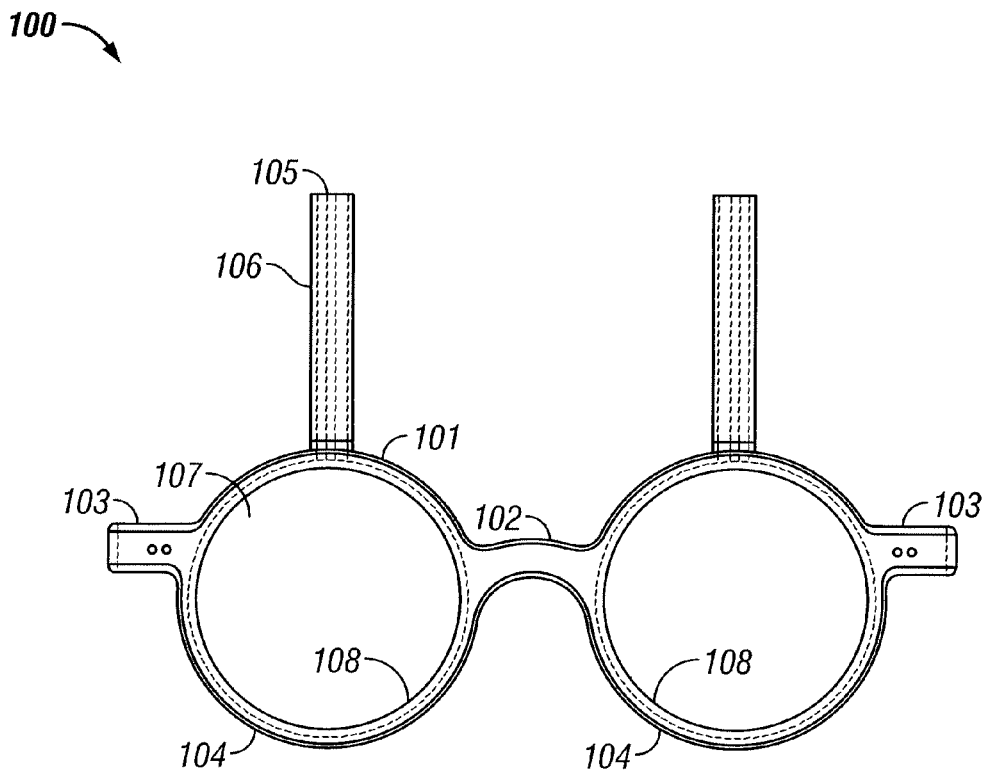
FIGS. 1A and 1B are side and perspective views, respectively, of ophthalmic spectacle lens eyewear in accordance with one embodiment of the present invention.
Figure 1B:
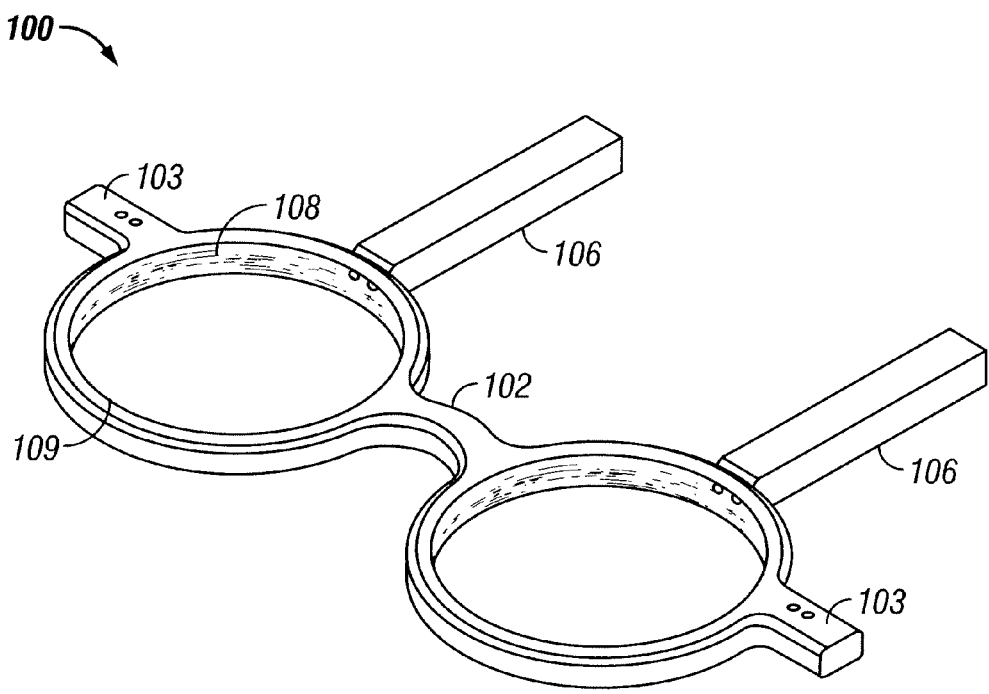

Referring now to the figures, which are illustrative of multiple embodiments of the present invention only and are not for purposes of limiting the same, FIGS. 1A and 1B depict ophthalmic spectacle lens eyewear in accordance with one embodiment of the present invention. The ophthalmic eyewear 100 includes frame front 101 with a bridge or nose piece 102 and end-pieces 103 to which conventional temples or earpieces are attached. The frame also includes a pair of eyewire portions 104 for holding lenses 107. A housing 106 including two capillary tubes 105 is attached to each eyewire portion 104 such that the capillary tubes 105 are in fluid communication with the interior side of the eyewire portion 104.

During formation of the lenses, a monomer blend containing initiators and/or catalysts is directed into a lens cavity through one capillary tube 105 in the capillary housing 106 in a manner that allows the air to release through the alternate capillary tube 105 in the same capillary housing 106. The capillary tubes 105 are capable of retaining a volume in excess of the shrinkage that occurs during the monomer blend polymerization. In addition, the capillary tubes 105 prevent the formation of an air bubble in the lens 107 by retracting liquid monomer into the prescription lens as required. In further embodiments, a chamber other than a capillary tube may be provided to retain an additional about 2-5% of the volume of the lens 107. The capillary tube housings 106 are removed after the lenses 107 are cast into the frame front 101.

Figure 1C:
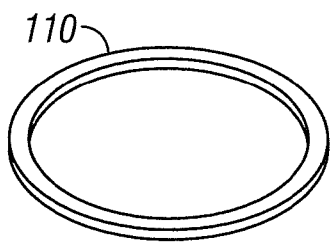
FIG. 1C is a perspective view of a gasket for use in the ophthalmic spectacle lens eyewear of FIGS. 1A and 1B.
Figure 2A:
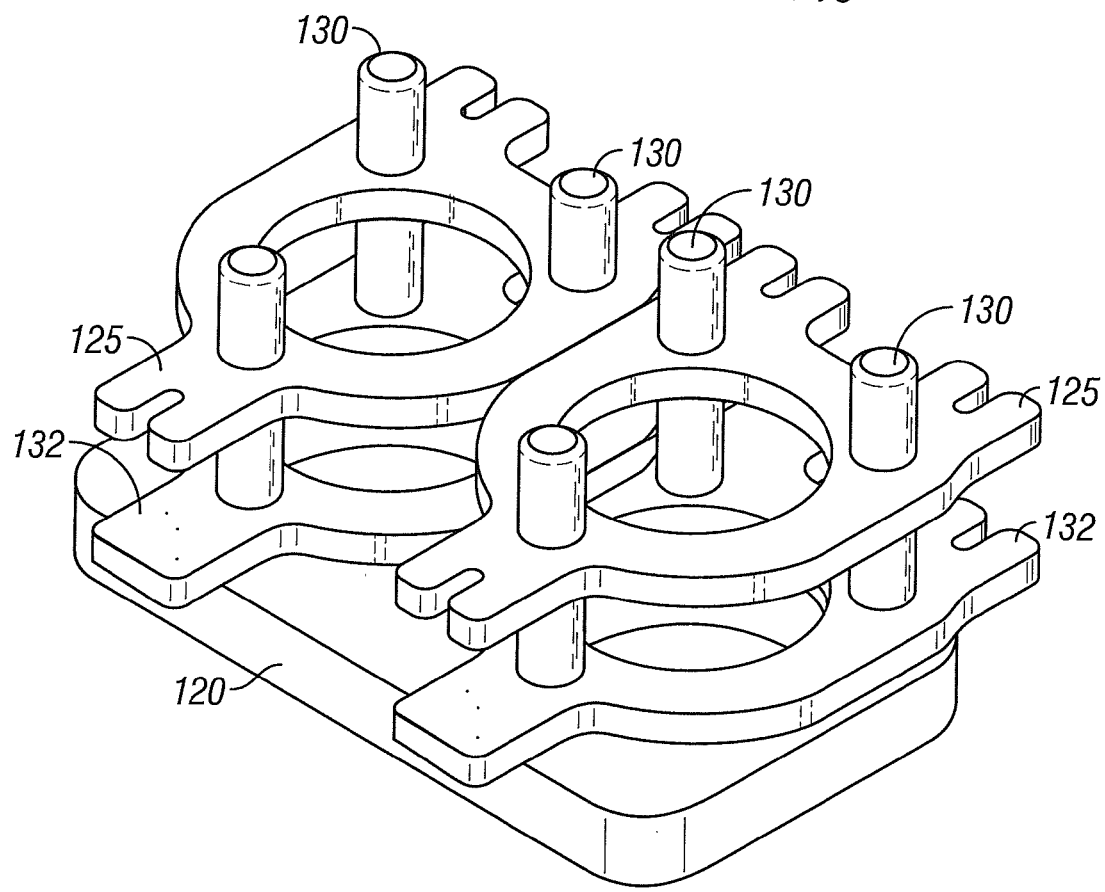
FIG. 2A is a perspective view of a block mold for the ophthalmic spectacle lens eyewear of FIGS. 1A and 1B, in accordance with one embodiment of the invention.
Figure 2B:
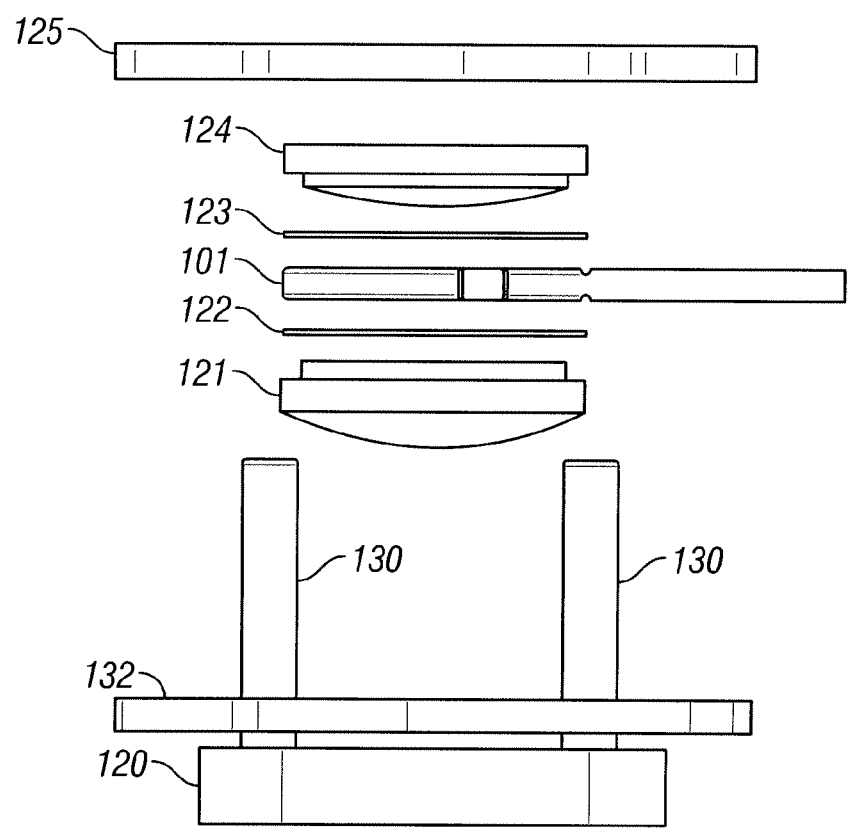
FIGS. 2B and 2C are side view of the block mold of FIG. 2A.
Figure 2C:
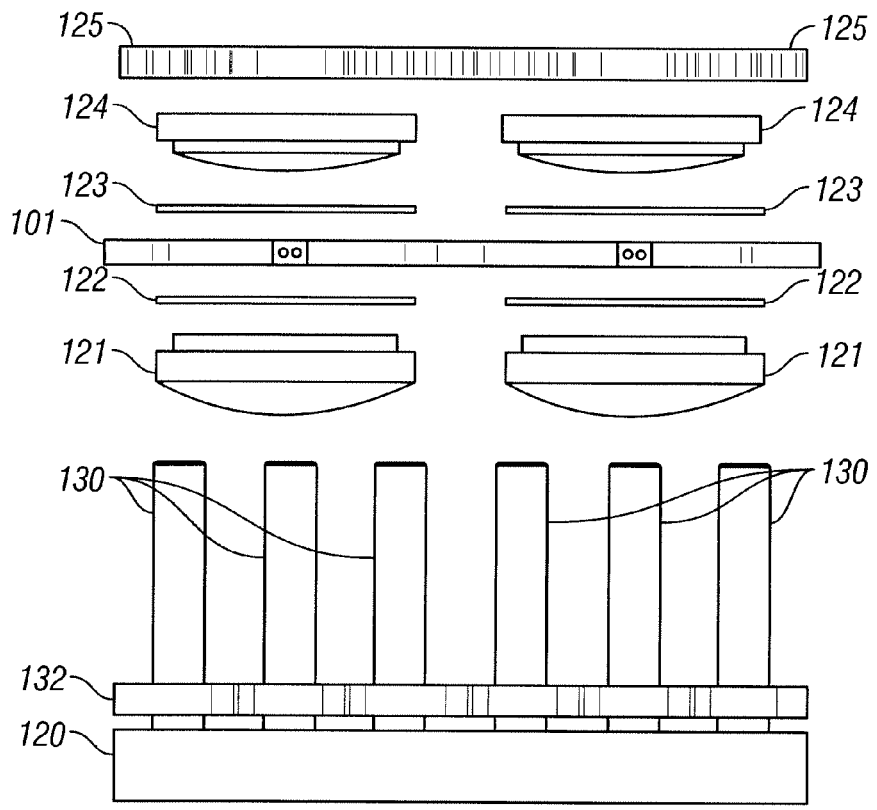
Figure 2D:
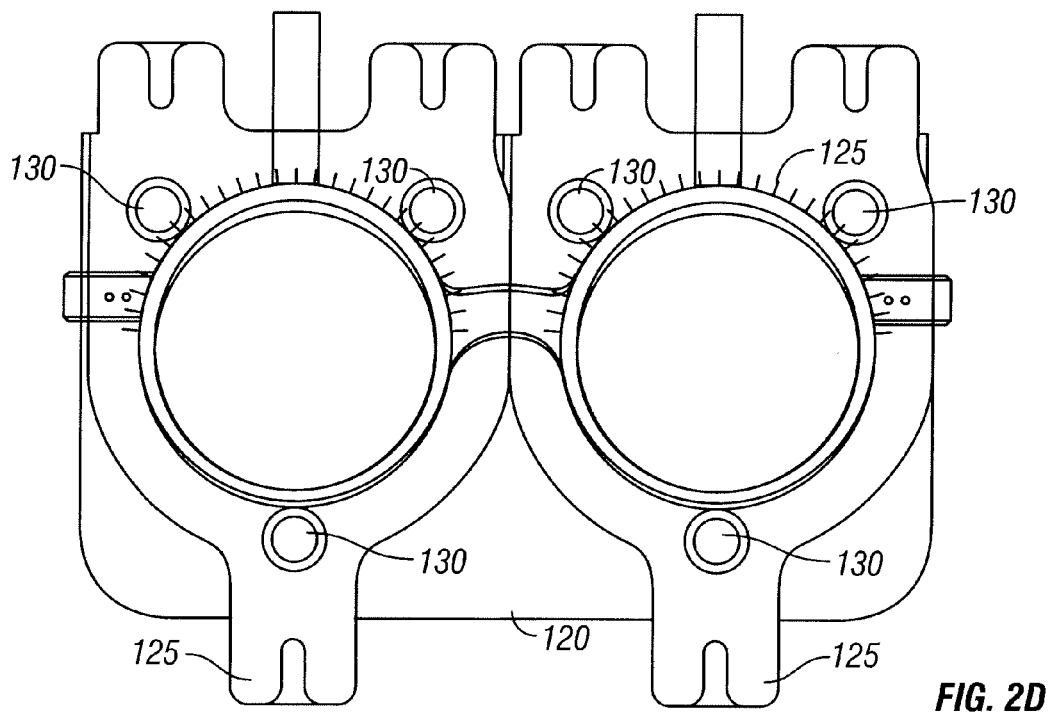
FIG. 2D is a top view of the block mold of FIG. 2A.
Figure 3A:
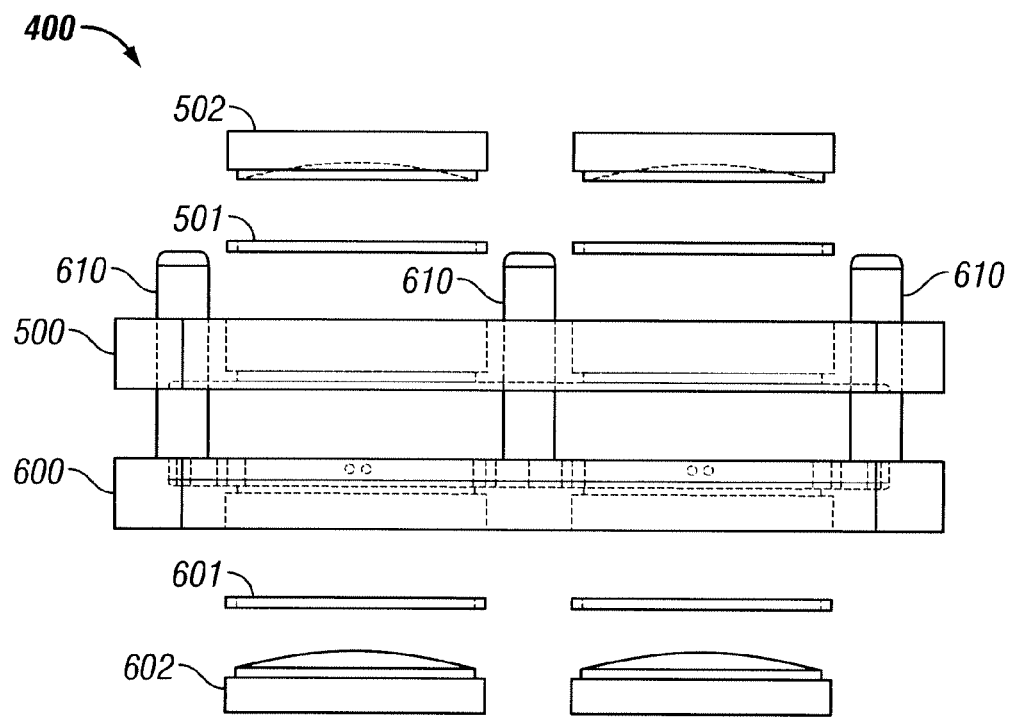
FIGS. 3A and 3B are side views of a one-piece block mold for the ophthalmic spectacle lens eyewear of FIGS. 1A and 1B, in accordance with one embodiment of the invention.
Figure 3B:
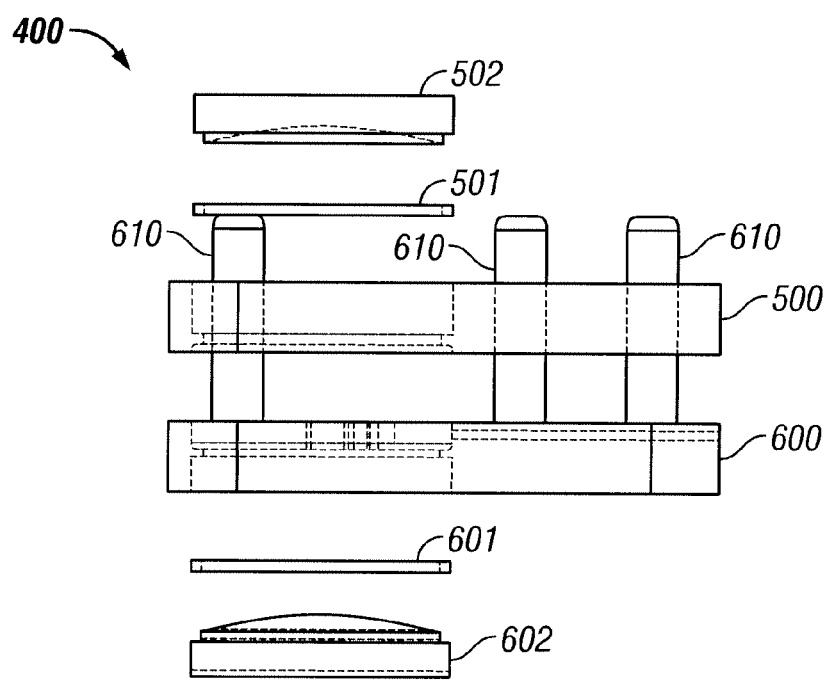
Figure 3C:
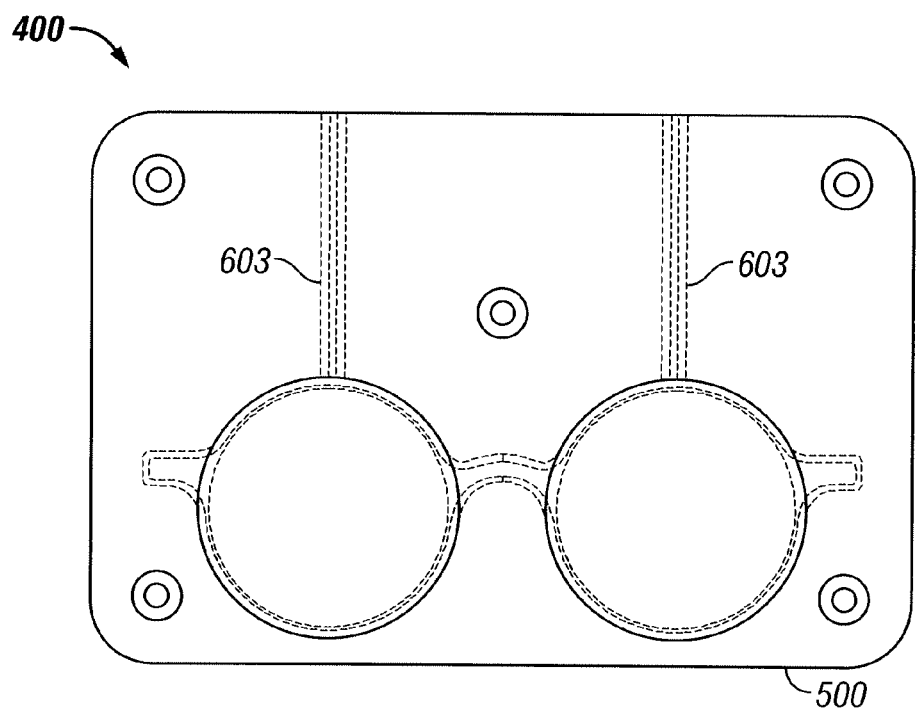
FIGS. 3C-3E are top, top perspective, and bottom perspective views, respectively, of the one-piece block mold of FIGS. 3A and 3B.
Figure 3D:
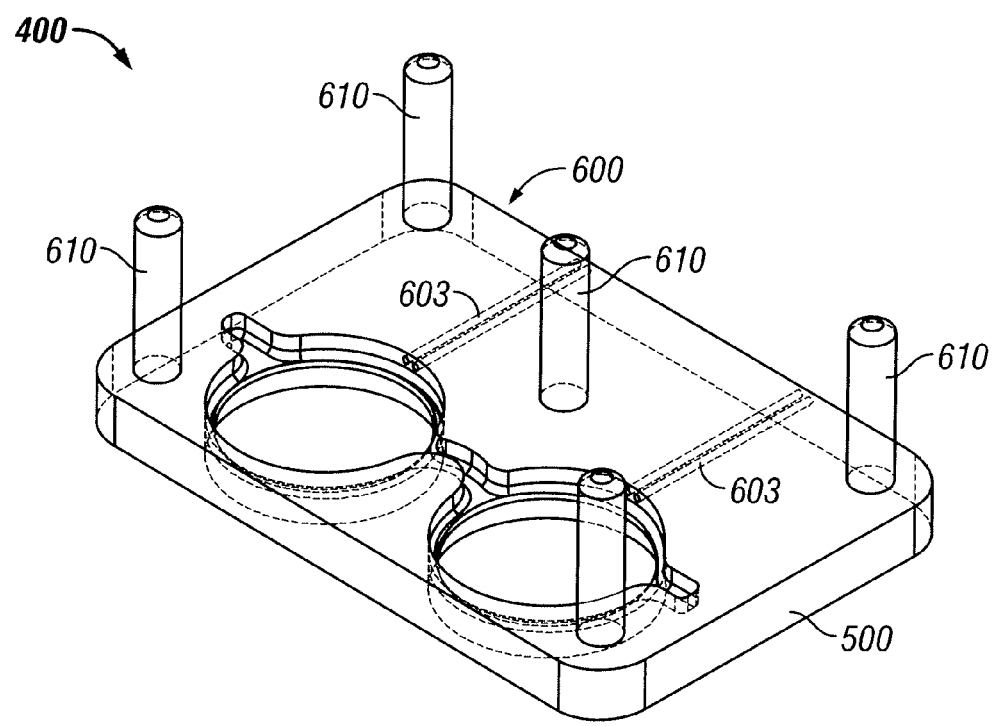
Figure 3E:
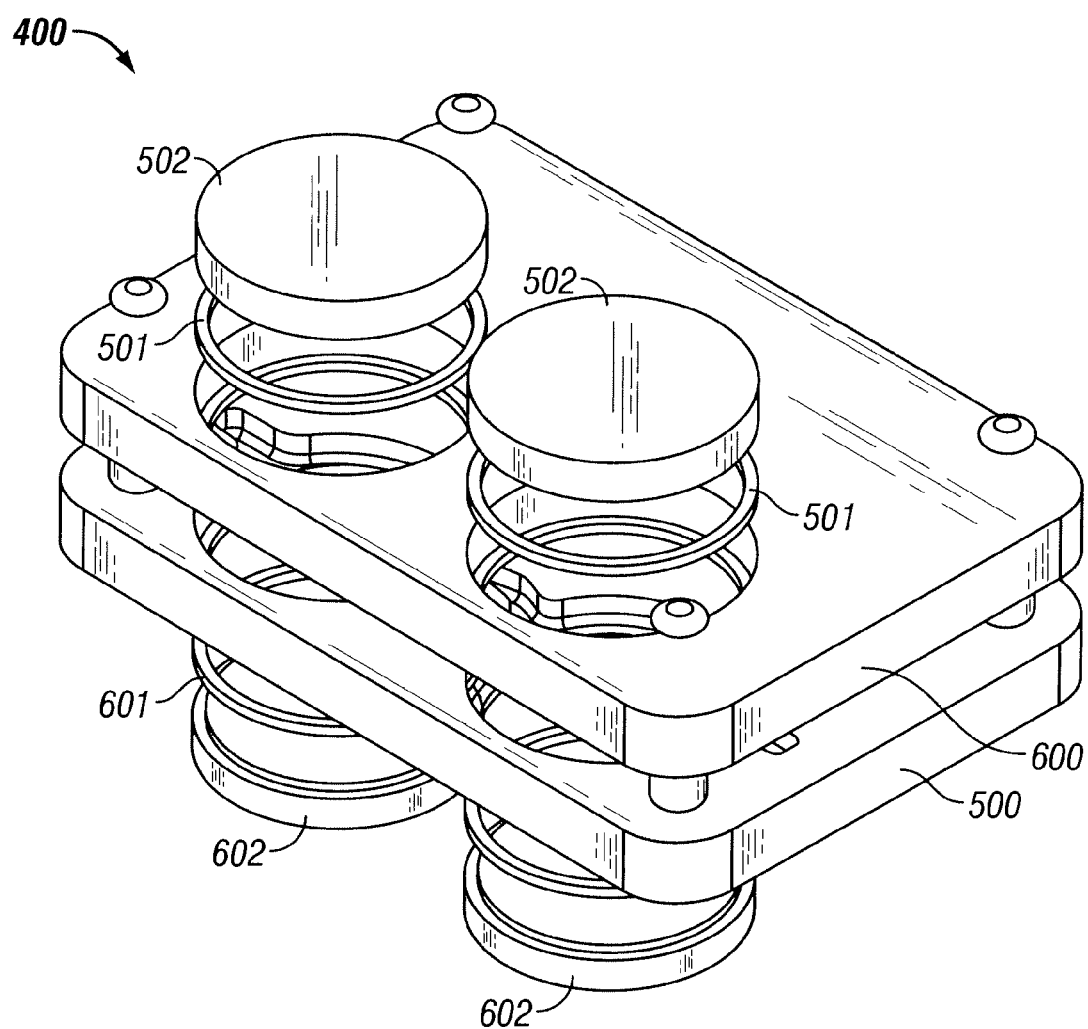
Figure 4A:
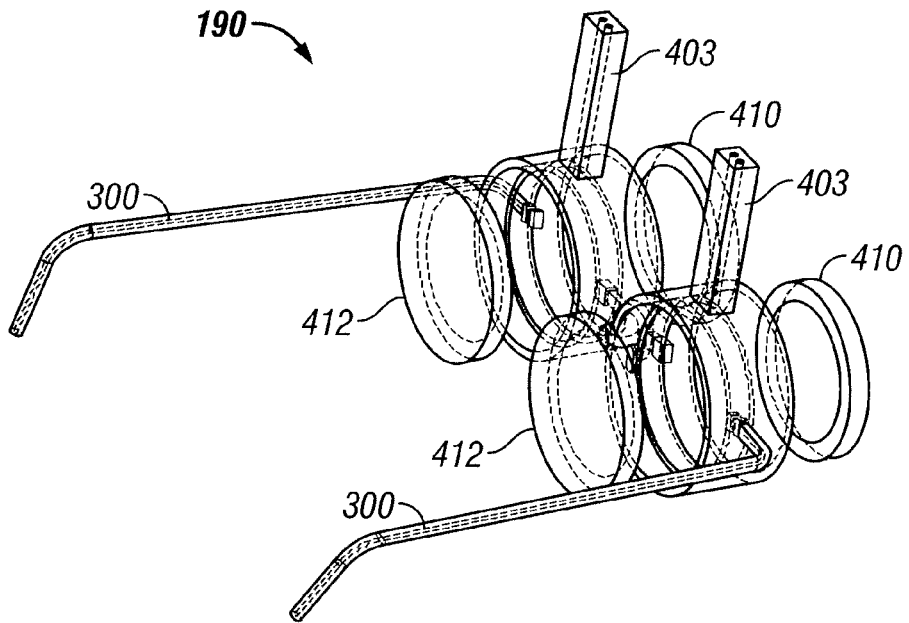
FIGS. 4A-4D are perspective, front, side, and top views, respectively, of an alternate frame in the form of a three piece mount, in accordance with one embodiment of the invention.
Figure 4B:
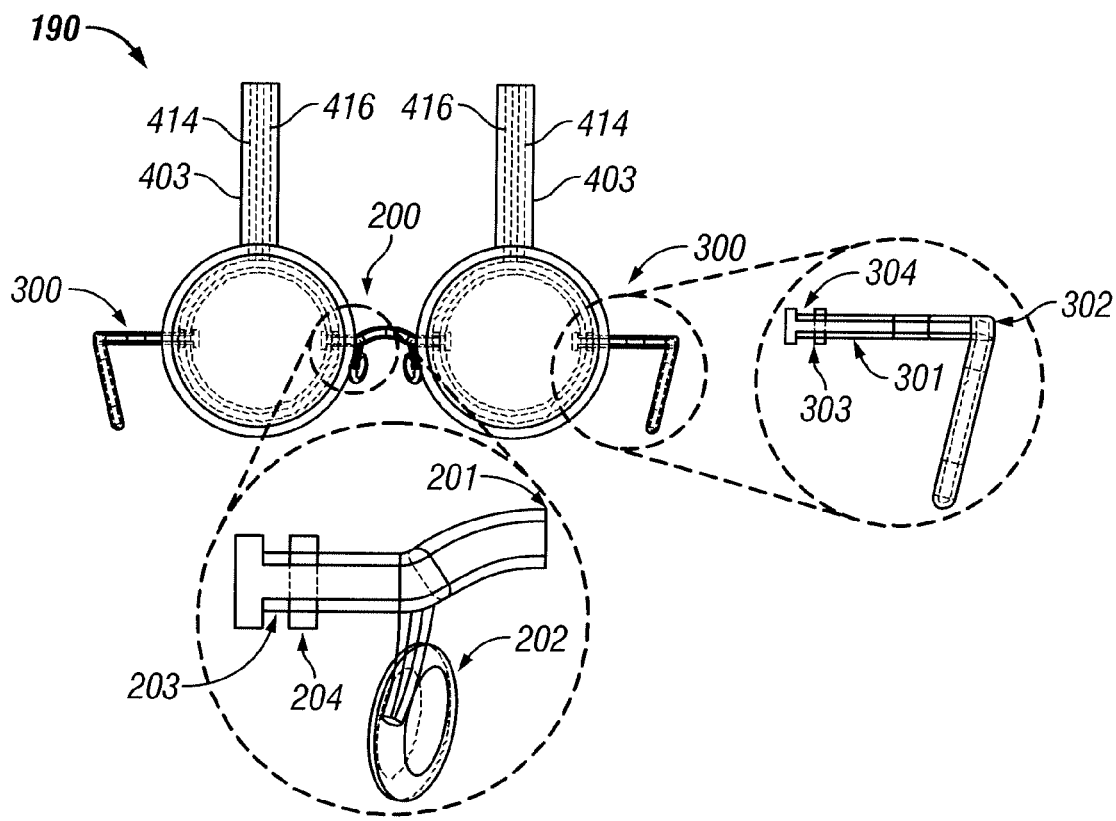
Figure 4C:
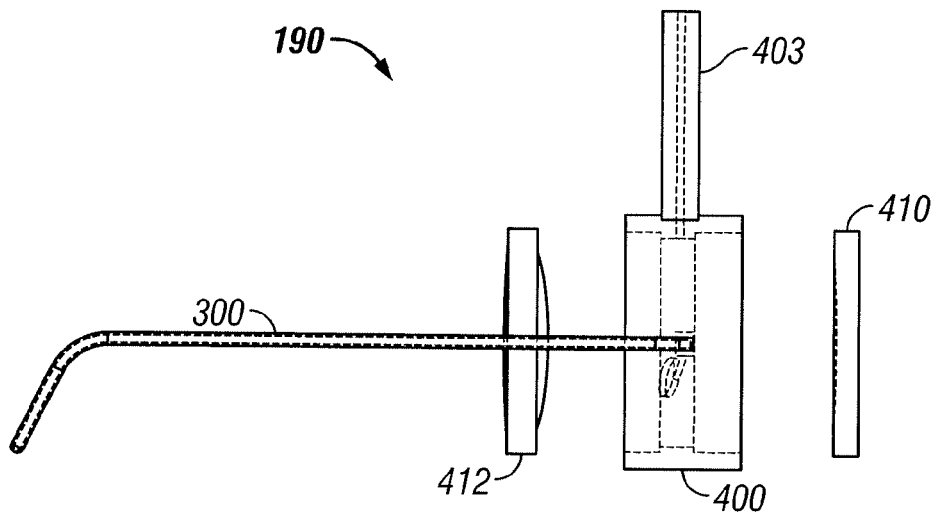
Figure 4D:
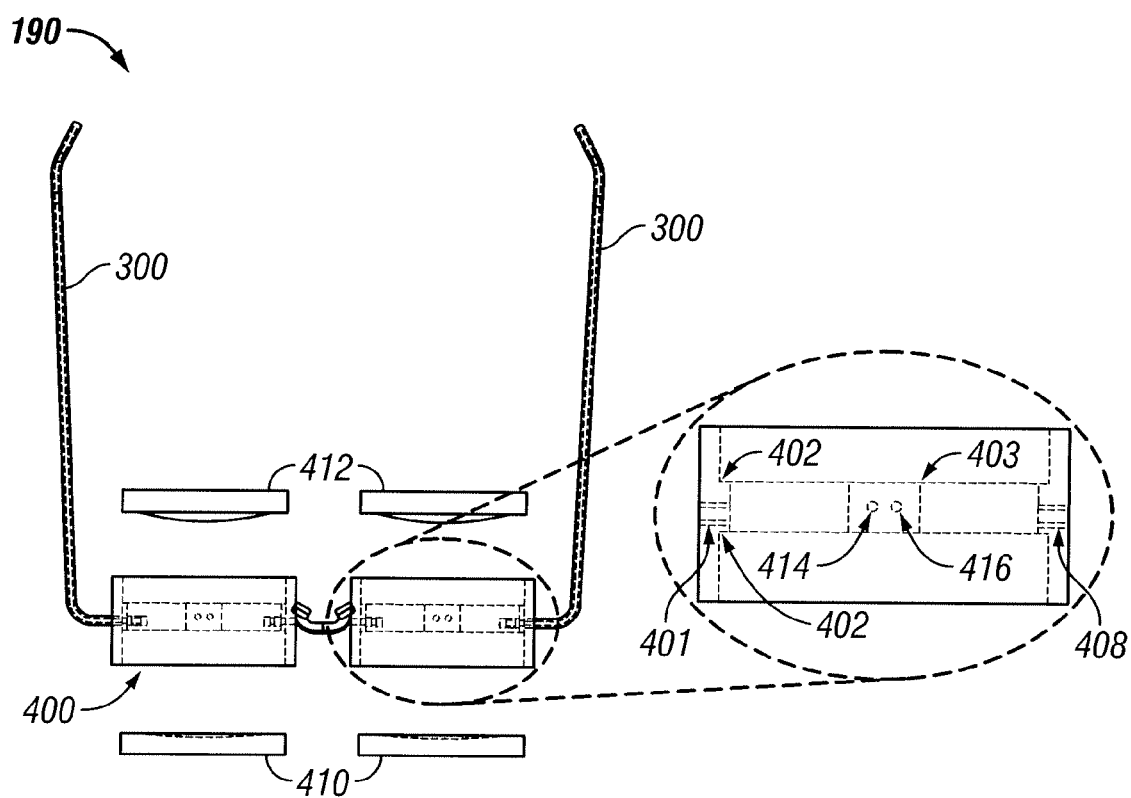

With further reference to FIGS. 1A and 1B, the frame front 101 includes a channel 108 to assist in retaining the cast lenses 107 in the frame front 101 and a notch or extrusion 109 in the channel to prevent the lenses 107 from rotating in the event the shape of the eyewire portion 104 is round. In some embodiments, the anterior and posterior aspect of the eyewire portion 104 is flat to accommodate a flat gasket 110 (FIG. 1C). The gasket 110 may be selected from a plurality of gaskets having different thicknesses that compensate for both severe and minor prescriptions having a variety of center and edge thicknesses. In further embodiments, the frame front 101 is rounded and an inverse curved surface gasket is employed. The gasket 110 and frame front 101 have a similar surface shape to produce a proper seal. In the illustrated embodiment, a curved channel 108 is employed in the eyewire portions 104 of the frame front 101. The curved shape acts to improve exposure to light and achieve more complete curing as compared to a conventional V-shaped channel that may shadow and cause resultant incomplete polymerization. In an alternative implementation, a V-shaped channel may be employed. In one implementation, the mold housing for forming ophthalmic eyewear 100 may be made of acrylic, which transmits most of the UV light. In other implementations, the mold may be made of any hard clear material that will transmit the majority of the UV light, such as polycarbonate. The ring-shaped gaskets of FIGS. 1 and 3 may be made of rubber Referring to FIGS. 2A-2D, a block mold 120 including bottom pressure plate 132 and dowels 130 is configured to receive first a front optical insert 121 followed by a front optical insert gasket 122, the frame front 101, a back optical insert gasket 123 and a back optical insert 124. A protractor insert 125 is placed over the back optical insert 124. In this manner, the frame front 101, inserts 121, 124 and gaskets 122, 123 are sandwiched between top and bottom pressure plates 125, 132, wherein the protractor insert acts as the top pressure plate 125.

The same components are used for a second lens for the other side of the ophthalmic eyewear frame 100.

The lenses 107 in the ophthalmic eyewear of the present invention include a range from approximately +20.00 diopters to −20.00 diopters of spherical power and up to 6.00 diopters of cylinder power for the correction of astigmatism.

The lenses 107 are configured to be single vision or bifocal. Progressive addition lenses may be provided for the correction of presbyopia. The front optical insert 121 contains the spherical, bifocal or progressive addition geometry. The bifocal or progressive addition front optical insert 121 is positioned to be at the bottom of the lens for a near vision or reading visual path. The back optical insert 124 is spherical or cylindrical. The cylindrical back optical insert 124 is rotated to create the proper axis for the correction of astigmatism. The front optical inserts 121 may be manufactured from glass, metal or one of a number of formulations of plastic to which the monomer blend containing initiators and/or catalysts will not adhere when polymerized. In one embodiment, polypropylene is employed. In some embodiments, the inserts may be formed to allow the transmission of UV light. The eyeglass frame may be formed using any suitable frame material. By way of example, a Delrin® eyeglass frame (using virgin polyacetal) may be employed such that the monomer does not adhere to it when polymerized.

In accordance with some embodiments of the invention, the lenses are made of a monomer that can be cured by thermal energy or electromagnetic radiation. By way of example, near ultraviolet and polychromatic white light and/or sunlight may be employed.

B. Methods of Fabricating

The lenses in the ophthalmic eyewear of the present invention are produced by filling a cavity with a monomer blend containing initiators and/or catalysts. With reference to FIGS. 2A-2D, the cavity is created by the frame front 101, front and back optical insert gaskets 122, 123 and front and back optical inserts 121, 124. In some embodiments, the monomer contains at least one photoinitiator that is designed to be reactive to the wavelength of light selected for the curing station. For example, near ultraviolet and polychromatic white light may be used. Alternatively, curing or polymerizing in situ on the eyeglass frame can be achieved by the controlled application of heat.

The mold is assembled by selecting a front optical insert 121 from a look up table or software program that directs the user to the proper radius front surface mold for a given lens prescription based on the index of refraction of the cured polymer. The front optical insert 121 is placed with the usable concave side facing upward. A front insert gasket 122 is then placed in the recesses of the front optical insert 121 followed by placing the frame front 101 against the front optical insert 121. Subsequently, a back optical insert gasket 123 is selected from a look up table or software program that directs the user to the proper gasket thickness for a given lens prescription. A back optical insert 124 is then selected from a look up table or software program that directs the user to the proper back optical insert for a given lens prescription. The back optical insert 124 is placed on the back optical insert gasket 123 with its usable convex surface facing the concave surface of the front optical insert 121. The protractor retaining device 125 is then mounted over the back optical insert 124. The cylindrical back optical insert 124 contains a scribe mark on the back surface of the insert that is aligned with the axis of the cylinder. The back optical insert 124 is rotated to align the scribe mark of the axis indicated by the look up table or software program that directs the user for a given lens prescription with the indicated degree orientation on the protractor.

The procedure is repeated for the corresponding second lens in the ophthalmic eyewear frame front 101.

With reference to FIGS. 1A and 1B, the monomer blend containing initiators and/or catalysts is directed into the cavity through one capillary tube 105 in the capillary housing 106 of the first lens cavity in a manner that allows the air to release through the alternate capillary tube 105 in the same capillary housing 106. As disclosed herein, the capillary tubes 105 are capable of retaining a volume in excess of the shrinkage that occurs during the monomer blend polymerization and prevent the formation of an air bubble in the lens 107 by retracting liquid monomer into the prescription lens as required. Alternatively, a chamber other than a capillary tube may be provided to retain an additional about 2-5% of the volume of the lens 107. When all the air is released and the liquid monomer begins to express from the air relief capillary tube, the cavity filling is complete. After both cavities are filled, the mold assembly 120 (with the eyewear, gaskets, inserts and filled cavities) is transferred to the curing station and the cavities are exposed to the proper light source for the prescribed period to initiate and complete the polymerization of the lenses 107. Alternatively, the curing or polymerizing in situ on the eyeglass frame can be achieved by the controlled application of heat or exposure to sunlight.

Referring again to FIGS. 2A-2D, the block mold 120 is then opened by reversing the steps for the assembly of the mold. The closure mechanism is removed, followed by the protractor insert 125. The eyewear 100 is removed with the front and back optical inserts 121, 124 and gaskets 122, 123 attached. The front optical insert 121 and gasket 122 are removed by applying a deforming pressure at the junction of the frame 101 and the front optical insert 121 and allowing air to pass between the optical insert and the polymerized lens. The front insert 121 is then released and the procedure is repeated for the back optical insert 124. The procedure is repeated for the second ophthalmic eyewear lens.

The next steps involve detaching the capillary tubes 105 from the rim of the frame front and attaching the conventional earpieces to the end-pieces 103 of the eyewear frame front 101. One suitable material for the block mold 120 is soft polyvinyl chloride (PVC).

C. Additional Embodiments

A further embodiment of the invention comprises a one-piece block mold that is prepared in the form of the frame. In particular, a front optical insert and front optical insert gasket are assembled to the block mold cavity having the configuration to form the front half of the frame followed by the assembly of the back mold half having the configuration to form the back half of the frame. The back optical insert gasket is assembled to the back frame half cavity and the back optical insert is assembled. Subsequently, a protractor insert is assembled and the axis of the back optical insert is adjusted followed by the mold closure device.

Referring to FIGS. 3A-3E, the one-piece block mold 400 comprises top plate 500, bottom plate 600 and dowels 610 configured to receive the back optical insert 602 followed by the back optical insert gasket 601, the top plate 500, a front optical insert gasket 501 and a front optical insert 502. The top plate 500 is dimensioned to form the back half of the frame front 101 of FIGS. 1A and 1B including bridge or nose piece 102, end-pieces 103 and a pair of eyewire portions 104 for holding lenses 107. The back plate 600 is dimensioned to form the front half of the frame front 101 of FIGS. 1A and 1B including bridge or nose piece 102, end-pieces 103 and a pair of eyewire portions 104 for holding lenses 107. Additionally, two capillary tubes 603 (for each lens 107) are provided within the top plate 500 such that the capillary tubes 603 are in fluid communication with the interior side of the front mold 500 and the back mold 600. The capillary tubes 603 act to hold a volume of liquid monomer for the liquid lenses 107 during formation. In particular, the capillary tubes 603 are capable of retaining a volume in excess of the shrinkage that occurs during the monomer blend polymerization. In addition, the capillary tubes 603 prevent the formation of an air bubble in the lens 107 by retracting liquid monomer into the prescription lens as required. In further embodiments, a chamber other than a capillary tube may be provided to retain an additional about 2-5% of the volume of the lens 107.

Referring now to FIGS. 4A-4D, according to further embodiments of the invention, an alternate frame in the form of a three piece mount 190 comprises a bridge 200 that is cast into the right and left spectacle lens, and left and right end-piece 300 that are cast into the lateral aspect of each of the spectacle lenses. The bridge 200 comprises an arch 201 and adjustable nose pads 202, an extension 203 that is cast into the lens, and a seal 204 that conforms to an aperture 401 in gasket 400, which retains the front and back optical inserts 410, 412. The end-pieces 300 are comprised of an extension 304 that is cast into the lens, a face portion 301, a hinge portion 302 and a seal 303 that conforms to another aperture 408 in the gasket 400. A single gasket 400 with two apertures 401, 408 for the bridge 200 and end-piece 300 is used for each lens. The gasket 400 comprises recesses 402 for each of the front and back optical inserts 410, 412. A series of gaskets is utilized, each having a different separation distance between the seating position of the front and back optical inserts. The proper gasket is selected from a look up table or software program that directs the user to the proper gasket for a given lens prescription.

With further reference to FIGS. 4A-4D, the optical insert gasket 400 is configured with a housing 403 with two capillary tubes 414, 416 for filling the mold cavity with the monomer blend containing initiators and/or catalysts and for the release of air from the cavity. Similar to previous embodiments, the capillary tubes 414, 416 are capable of retaining a volume in excess of the shrinkage that occurs during the monomer blend polymerization and prevent the formation of an air bubble in the lens by retracting liquid monomer into the prescription lens as required. Alternatively, a chamber other than a capillary tube may be provided to retain an additional about 2-5% of the volume of the lens.

One skilled in the art will appreciate that the present invention can be practiced by other than the various embodiments and preferred embodiments, which are presented in this description for purposes of illustration and not of limitation, and the present invention is limited only by the claims that follow. It is noted that equivalents for the particular embodiments discussed in this description may practice the invention as well.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative embodiments may be implemented to achieve the desired features of the present invention. Also, a multitude of different constituent part names other than those depicted herein may be applied to the various parts of the devices. Additionally, with regard to operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent.

The invention claimed is:

1. A method of manufacturing spectacle lens eyewear using a block mold, front and back optical inserts, front and back optical insert gaskets, a protractor insert, a closing mechanism and a preformed frame, the method comprising the steps of:
   selecting a front optical insert from a look up table or computer program product and assembling the insert into the block mold;
   selecting a front optical insert gasket and assembling the gasket onto the front optical insert;
   assembling the frame front onto the front optical insert gasket;
   selecting a back optical insert gasket and assembling the gasket onto the back side of the frame front;
   selecting a back optical insert from a look up table or computer program product and assembling the insert onto the back optical insert gasket;
   assembling the protractor insert and adjusting the position of the back optical insert to the axis indicated on a look up table or computer program product;
   assembling the mold closing mechanism and securing the mold;
   filling the cavity through a first capillary tube;
   curing the closed mold to polymerize the lenses;
   removing the ophthalmic eyewear from the block mold and releasing the front and back optical inserts and insert gaskets; and
   removing the capillary tube housing and attaching earpieces.

2. The method of claim 1, wherein the step of curing the closed mold comprises placing the closed mold into a curing station or in ambient natural light for a prescribed length of time to polymerize the lenses.

3. The method of claim 1, wherein the step of curing the closed mold is achieved by the controlled application of heat.

4. The method of claim 1, wherein the preformed frame comprises a capillary housing including the first capillary tube for filling the cavity and a second capillary tube for the release of air and excess mold material, and wherein, the capillary tubes prevent the formation of an air bubble in the lens by retracting liquid monomer into the prescription lenses as required.

5. The method of claim 1, wherein the preformed frame is made of plastic or metal.

6. The method of claim 1, wherein the preformed frame is made of cellulose acetate or polycarbonate.

7. The method of claim 1, wherein the preformed frame has a channel with at least one notch or extrusion.

8. The method of claim 1, wherein the back optical insert gaskets are provided in a series having a range z axis spacing from 0.1 to 10 millimeters.

9. The method of claim 1, wherein the optical inserts are manufactured from glass, metal, plastic or polypropylene.

10. The method of claim 1, wherein the block mold is assembled and filled with a monomer blend containing initiators and/or catalysts that is polymerized by thermal or electromagnetic radiation.

11. A method of manufacturing spectacle lens eyewear using a block mold, front and back optical inserts, front and back optical insert gaskets, a protractor insert, a closing mechanism and front and back frame cavities, the method comprising the steps of:
   selecting a front optical insert from a look up table or computer program product and assembling the insert into the block mold;
   selecting a front optical insert gasket and assembling the gasket onto the front optical insert;
   assembling the front frame half cavity onto the front optical insert gasket;
   assembling the back frame half cavity onto the front frame half cavity;
   selecting a back optical insert gasket and assembling the gasket onto the back frame half cavity;
   selecting a back optical insert from a look up table or computer program product and assembling the insert onto the back optical insert gasket assembling the protractor insert and adjusting the position of the back optical insert to the axis indicated on a look up table or computer program product;
   assembling the mold closing mechanism and securing the mold;

filling the cavity through a first capillary tube;

curing the closed mold to polymerize the lenses and frame;

removing the ophthalmic eyewear from the block mold and releasing the front and back optical inserts and insert gaskets; and removing the capillary tube housing and attaching earpieces.

12. The method of claim 11, wherein the step of curing the closed mold comprises placing the closed mold into a curing station or in ambient natural light for a prescribed length of time to polymerize the lenses.

13. The method of claim 11, wherein the step of curing the closed mold is achieved by the controlled application of heat.

14. The method of claim 11, wherein the preformed frame comprises a capillary housing including the first capillary tube for filling the cavity and a second capillary tube for the release of air and excess liquid monomer.

15. The method of claim 11 wherein the back optical insert gaskets are provided in a series having a range z axis spacing from 0.1 to 10 millimeters.

16. The method of claim 11, wherein the optical inserts are manufactured from glass, metal, plastic or polypropylene.

17. The method of claim 11, wherein the block mold is assembled and filled with a monomer blend containing initiators and/or catalysts that is polymerized by thermal or electromagnetic radiation.

18. A method of manufacturing spectacle lens eyewear using a block mold, front and back optical inserts, an optical insert gasket, a protractor insert, a closing mechanism and a nosepiece and end-pieces, the method comprising the steps of:

selecting a front optical insert from a look up table or computer program product and assembling into the block mold;

selecting an optical insert gasket and assembling the gasket onto the front optical insert;

assembling a nosepiece and end-pieces with seals into the optical insert gasket;

selecting a back optical insert from a look up table or computer program product and assembling the insert in onto the back optical insert gasket assembling the protractor insert and adjusting the position of the back optical insert to the axis indicated on a look up table or computer program product;

assembling the mold closing mechanism and securing the mold;

filling the cavity through a first capillary tube in the optical insert gasket;

curing the closed mold to polymerize the lenses;

removing the ophthalmic eyewear from the block mold and releasing the front and back optical inserts and cutting and removing the optical insert gasket; and attaching the earpieces to the end-pieces.

19. The method of claim 18, wherein the step of curing the closed mold comprises placing the closed mold into a curing station or in ambient natural light for a prescribed length of time to polymerize the lenses.

20. The method of claim 18, wherein the step of curing the closed mold is achieved by the controlled application of heat.

21. The method of claim 18, wherein the nose piece and end-pieces are made of plastic or metal.

22. The method of claim 18, wherein the optical insert gaskets are provided in a series having a range z axis spacing from 0.1 to 12 millimeters.

23. The method of claim 18, wherein the optical inserts are manufactured from glass, metal, plastic or polypropylene.

24. The method of claim 18, wherein the block mold is assembled and filled with a monomer blend containing initiators and/or catalysts that is polymerized by thermal or electromagnetic radiation.

* * * * *